INFORMATION STORAGE APPARATUS

Filed Oct. 12, 1965 Sheet 1 of 2

INVENTOR
THOMAS W. DOMBECK
BY Stanley Wolder
ATTORNEY

INVENTOR
THOMAS W. DOMBECK
BY Stanley Wolder
ATTORNEY

United States Patent Office 3,445,715

Patented May 20, 1969

3,445,715

INFORMATION STORAGE APPARATUS

Thomas W. Dombeck, 525 First Ave., Ellwood City, Pa. 16117

Filed Oct. 12, 1965, Ser. No. 495,045
Int. Cl. H01j 29/70
U.S. Cl. 315—18 9 Claims

ABSTRACT OF THE DISCLOSURE

An information storage and retrieval apparatus comprises an evacuated envelope in which is positioned an information storage target plate including a metal substrate and a 0.5 to 4.0 micron thick high resistance layer having a resistivity of $10^5$ to $10^{10}$ ohm meters, and an electron beam gun sharply focused on the high resistance layer. The beam is X and Y address modulated and intermittently intensity modulated in accordance with input information to form discrete recesses of less than 2.0 micron diameter at least some of which are imperforate. Readout is effected by sweeping the target across the target address area and measuring the signal picked up by the target substrate.

The present invention relates generally to improvements in information storage devices and it relates particularly to an improved electronically read permanent information storage unit which may be prepared with predetermined information and an apparatus for imparting to and reading out information from the storage unit.

In the past, high speed electronic storage devices have been complicated in operation or have required complex external circuitry whether used in computers or in other applications. Among those devices previously used are storage tubes which utilize the scanning beam of a cathode ray tube and store information as small charges deposited on the surface of a dielectric. The charges, however, dissipate rapidly from the surface and the information is of very short duration and must either be rapidly retrieved or employed or repeatedly reinserted or restored.

Another conventional memory device uses small memory cores of a magnetic material which store numbers in binary form by the direction of its magnetic field. These cores are arranged in a three dimensional array and the electronic means which selects individual cores is a mesh of wires intersecting within the cores. This type of storage is permanent but only one read out ot the information is permitted and for further storage the information must be restored. Also, magnetic inductance is slow in comparison with current flowing in a wire, so the speed of storing or reading information is limited.

Other devices have been used, such as magnetic tape, magnetic drums and mercury delay tubes. Collectively, none of these devices offer the user a large storage capacity for the required space of circuitry.

It is therefore a principal object of the present invention to provide an improved information storage or memory device.

Another object of the present invention is to provide an improved unit for permanently storing information which may allow rapid electronic retrieval of this information.

Still another object of the present invention is to provide an improved permanent memory unit, selected predetermined areas of which may be rapidly read without reducing the clarity of the stored information.

Another object of the present invention is to provide an improved memory unit for permanently storing rapidly accessible information characterized by a large capacity per unit area.

A further object of the present invention is to provide an improved electronic permanent memory unit which may be mass produced with predetermined information and may have additional information permanently stored therein by a simple apparatus which may be employed for reading out information from the memory unit.

Still a further object of the present invention is to provide an improved apparatus for rapidly permanently storing and reading out information characterized by its simplicity, reliability and high relative capacity.

The above and other objects of the present invention will become apparent from a reading of the following description taken in conjunction with the accompanying drawing, wherein.

In a sense the present invention contemplates the provision of a memory unit comprising a substrate of a relatively low resistivity or high conductivity having a thin coating or face layer of a relatively high resistivity or low conductivity, the face layer having spaced recesses formed therein corresponding to predetermined stored information. The recesses may be in the form of wells extending only part way through the face layer or may be complete apertures through the face layer to expose corresponding areas of the underlying low resistivity substrate. The recesses represent bits of information and the memory unit may be formed bearing predetermined information which may be applied thereto in any suitable or well known manner, by chemical etching the face layer, by photoengraving, by printing procedures or the like. In use the memory unit is positioned in a suitably sealed housing and exposed to a finely focused electron beam and means are provided for controllably scanning predetermined areas of the memory unit face layer. When information is being read out the scanning beam is of a low intensity whereby not to effect or etch the memory unit face layer. The information read out is in the form of pulses derived from the memory unit substrate and corresponding to the recesses formed in the face layer and their position and relationship to the unrecessed areas of the face layer. When information is impressed into the memory unit the beam intensity is increased in those areas where information recesses are to be formed to a value sufficient to form the desired recesses by melting or vaporizing minute areas of the face layers in the preselected positions.

Figure 2:
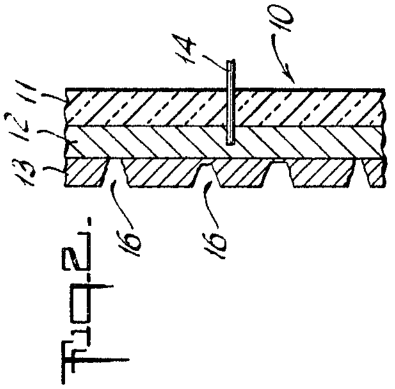
FIGURE 2 is an enlarged transverse sectional view thereof.
Figure 1:
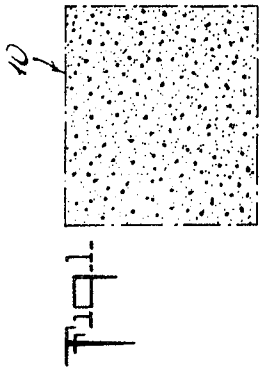
FIGURE 1 is a plan view of a memory unit embodying the present invention.

Referring now to the drawings and particularly FIGURES 1 and 2 thereof, which illustrate a preferred embodiment of the present invention, the reference numeral 10 generally designates the improved memory unit which may be of any desired shape or configuration. The memory unit 10 includes a backing or support plate 11 having superimposed on its front face a substrate 12 of relatively low resistivity, the substrate 12 being in turn coated on its front surface with a face layer 13 of relatively high resistivity. A conducting lead 14 extends from the substrate 12 rearwardly through the support plate 11.

Information is carried by the memory unit 10 in the form of recesses 16 of minute transverse cross section, the information being binary digital as represented by the presence or absence of recesses 16 in predetermined positions or addresses and the relationship of these recesses and absence of recesses. The recesses 16 may be in the form of relatively deep wells terminating in thin bases affording little resistivity across the thickness thereof or they may be in the form of apertures exposing the underlying substrate 12. The information delineating recesses 16 may be formed in the memory unit 10 prior to the positioning thereof in the associated read in and read out apparatus, as above set forth, or the information recesses 16 may be formed in the apparatus as will be hereinafter described, or both methods may be employed for storing the information in the memory unit 10.

The substrate 12 has a low resistivity preferably of an order less than 1000 ohm meters and may be formed of any suitable metal, for example copper, aluminum, or the like. The face layer 13 is of relatively high resistivity, advantageously between $10^5$ and $10^{10}$ ohm meters and preferably between $10^7$ and $10^9$ ohm meters and is of a thickness advantageously between 0.5 and 4.0 microns. The material forming the face layer 13 advantageously has a melting vaporizing temperature of less than 4000° C. and preferably between 400° C. and 3700° C. It should be noted that the face layer 13 should possess some conductivity, as aforesaid, to prevent the accumulation of a charge thereon. The material of the face layer 13 may be of an amorphous or crystalline nature and examples thereof are porcelains, lead based paints, crystallities such as $A_1O_2$, $O_aO_2$, and the like, semimetals such as carbon, silicon, etc., silicon dioxide, synthetic thermoset resins, etc. The face layer materials are preferably shock resistant, easy to degas and rugged.

The diameter of the recess 16 is advantageously less than 20 microns and preferably between 0.5 and 1 micron such being readily attainable either by the preparation methods above set forth or by the use of a focussed electron beam which may be produced in the conventional manner. It should be noted that recess diameters of as low as four angstrom units have been produced. By reason of the small diameter of the recesses 16 more than $10^8$ bits of information per square centimeter have been available in the memory unit 10 and with the smaller diameter recesses a much greater concentration of information may be stored.

Figure 3:
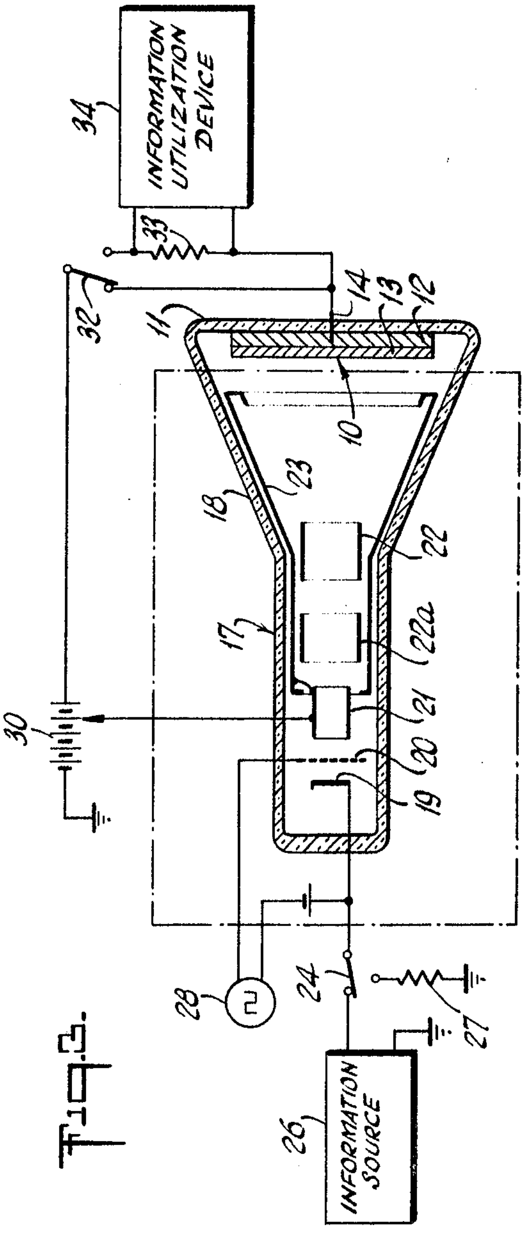
FIGURE 3 is a diagrammatic view of an improved apparatus employing the subject memory unit.

In FIGURE 3 of the drawing the memory unit 10 is shown with an associated electron beam forming section of a read in and read out network and device. The memory unit 10 is housed in a cathode ray tube 17 including an evacuated envelope 18 the front face of which defines the support plate 11 through which the conductor 14 extends. The face layer 13 is directed toward the electron gun which is of known construction and includes a cathode or electron source 19, an intensity control grid 20, an accelerating electrode 21, a focussing device **22*a*, a horizontal and vertical deflection system 22 which may be of the magnetic or electrostatic type and an accelerating electrode 23. The cathode 19 is alternatively connected by way of a double throw switch 24 to a pulsed information source 26 for read in or through a resistor 27 to ground for read out and is connected through a pulse generator 28 and a voltage source 29 to the control grid 20. The accelerating electrodes 21 and 23 are connected to an intermediate tap of a voltage source the negative terminal of which is grounded and the positive terminal of which is connected by way of a double throw switch 32 selectively directly to the memory unit substrate 12 or by way of a resistor 33 thereto, the resistor 33 being connected across the input of a conventional binary digital information utilization device 34. The deflecting device 22 is connected to a signal generator controlled in any known manner to scan selected areas of the target memory unit 10 in synchronism with pulse generator 28 and tied in with the information signal source 26 and the utilization device 34**.

When information is to be read out of the memory unit the switch 24 is positioned to place the resistor 27 into the circuit and the switch 32 is positioned to connect the utilization device into the circuit. The electron beam is scanned over predetermined areas of the memory unit 10 as determined by the respective addresses controlling the electron beam by way of the deflecting device 22 and the beam is regularly periodically pulsed by the generator 28 in accordance with the information receiving areas of the memory unit 10 that is the position pattern of the information bits as represented by the presence or absence of recesses 16. It should be noted that the electron beam current is limited by the resistor 27 to a value which will not pit the memory unit face layer 13. Whenever the electron beam strikes a recess 16 a sharp pulse is generated at the substrate 12 which is picked up and utilized by the device 34 and related with the address to provide the requested information in the desired form.

The store information into the memory unit 10 by means of the electron beam the switch 24 is positioned to insert the information source into the circuit and the switch 32 is positioned to effect a direct connection between the memory unit face layer 13 and the voltage source 30. The information source produces pulses in accordance with the information to be stored and in synchronism with the address and scan signal applied to the deflecting device 22 and the pulses are of such value and duration as to modulate the electron beam to bombard corresponding areas of the face layer 13 with such intensity as to produce therein by melting or vaporization recesses 16 corresponding with said pulses.

The method of producing a recess 16 involves burning away of a minute area of face layer 13. Therefore, the electron beam must be capable of heating the face layer to its boiling or vaporizing temperature, do this rapidly, and do it in a small area only. The formula for beam heating is $$t = \text{ms.}/(6e\phi)(T^{-3} - T_0^{-3}) \quad (1)$$

where $t$ is the temperature at one instant (accounting for the denominator being in differential form rather than the better known thermodynamics equation where the term $e\phi T^4$ is used). In (Equation 1) $m$ is the mass, $s$ is the specific heat, $e$ is a constant of emissivity, $\phi$ equals $1.38 \times 10^{-12}$ calories $\gamma$ cm.$^2$ sec. degrees $^4$. Also, the numerator and denominator will be associated to the total energy of the beam. It is known that $e\phi T^4$ is given in watts/cm.$^2$. Therefore, if the beam energy is kept constant and its width decreased, the energy and therefore the temperature of the area on the coating will rise. In actual practice, it is found that a beam of $10^{-7}$ amperes at 5000 volts will be able to produce a spot about 7 angstroms to one micron in diameter. This is for a material depth of about 500 angstroms to one micron in a coating of carbon, boron or even silicon.

In practice a thin coating of silicon about one micron thick is used and a beam of about $10^{-7}$ amperes at 10,000 volts. The area of the focus is about one micron in diameter. The duration of time which the beam must remain on the target is a billionth of a second. In this time a considerable amount of the coating in this area is vaporized. It is also known that the major part of the beam's energy is near the center of a cross section of the beam. This means that the center of the beam will heat the coating more than the outside of the beam. Therefore the amount of material vaporized will be more at the center part of the beam than at the outside. This makes the hole created deep and precise, the hole will not be of the beam's diameter, but smaller. What is believed to happen in the burning process is that the material is liquified and boiled off. That which remains will fill the small hole to a small extent. This means that the hole is not clean through the material, but some, because of surface tension of the liquified material, will coat the sides and the bottom of the hole with a thin fused layer. This actually is to the advantage of the hole as this layer is extremely hard and prevents the hole from damage, giving the stored information a permanent, lifetime duration.

After the hole has been created it is distinguished from a nonhole by the amount of current it will pass. As mentioned earlier silicon has a conductivity, though very low. Carbon also fits very well into this scheme. Then, if we consider that the fused silicon at the bottom of the hole retains its same resistivity as the rest of the silicon of the coating then we can calculate the current passed in both instances. The formula is:

$$i=V/rL/A \qquad (2)$$

where $i$ is the current and $r$ the resistivity, L the thickness and A the area of the coating, and V the potential between the two faces. If we consider the hole to be about one-tenth a micron deep it is seen from (Equation 2) that the current will be a factor of ten higher for the hole than for an area of the disc where there is no hole.

Figure 4:
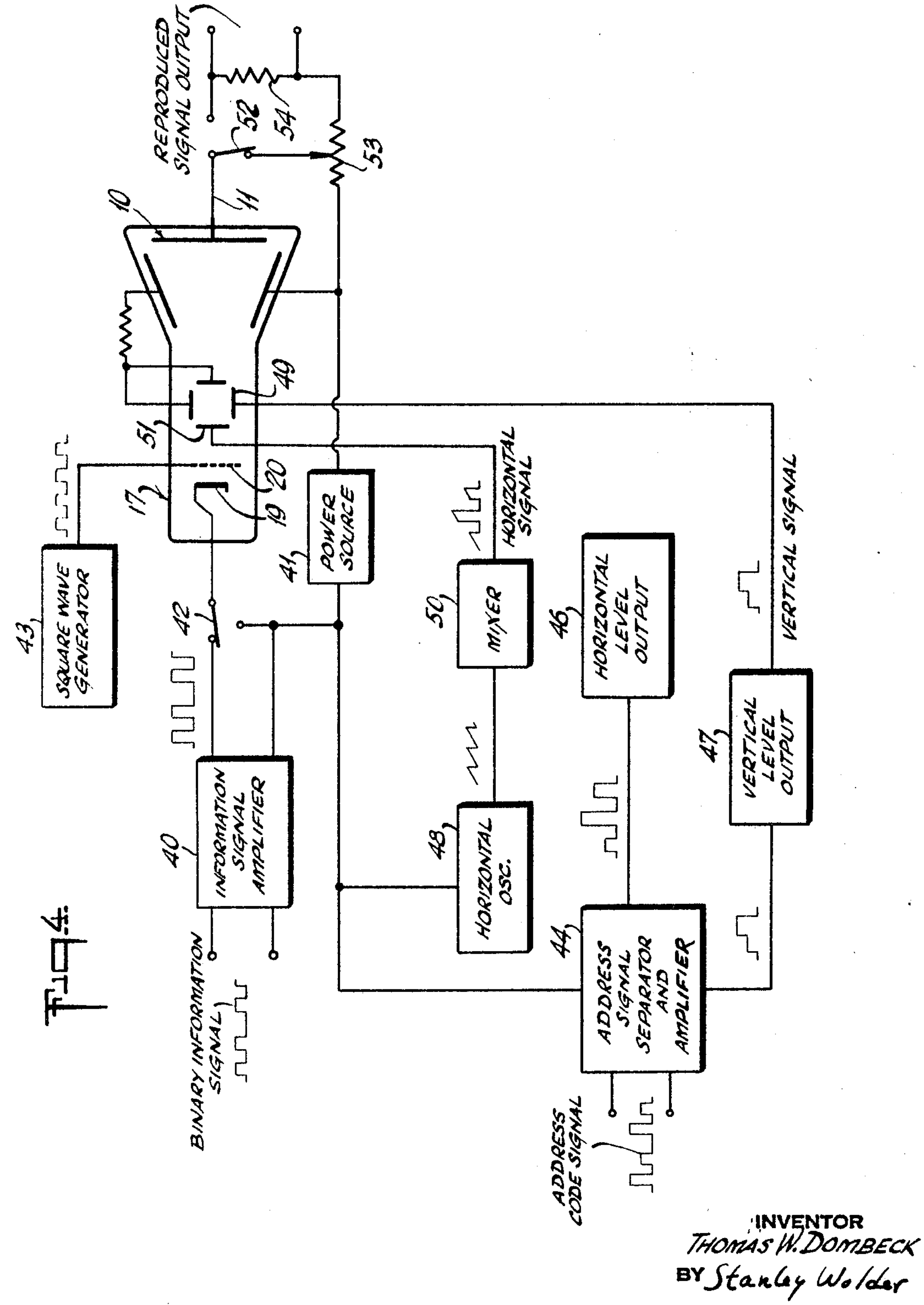
FIGURE 4 is a block diagram of a circuit network including the improved apparatus.

An example of a network employing the improved memory unit 10 is illustrated in FIGURE 4 of the drawing and includes the cathode ray tube 17 provided with the memory until 10 as a target. The binary information signal in the form of spaced pulses corresponding to the information is fed to an amplifier 40, powered by a voltage source 41, the output of the amplifier being connected through a double throw switch 42 to the cathode 19. The switch 42 selectively connects the cathode 19 to the amplifier 40 or directly to the voltage source 41 to bypass the amplifier 40. The control grid 20 is connected to a square wave generator 43.

The cathode ray beam is positioned and swept in accordance with an incoming address code signal by a network including a conventional signal separator and amplifier 44 the output of which is a pair of coded binary signals defining the vertical and horizontal coordinates of the address. The horizontal and vertical binary digital address signals are fed to the inputs of digital to analogue converters 46 and 47 respectively, the outputs of which are voltages of levels corresponding to the respective input addresses. A saw tooth generator 48 produces a signal which effects a horizontal sweep corresponding in width to the number of bits stored at each address, such number being as desired. The output of the vertical converter 47 is connected directly to the cathode ray tube vertical deflection plate 49 and the output of the horizontal converter 46 is mixed with the ouput of the generator 48 in a suitable network 50 and applied to the cathode ray tube horizontal deflection plate 51. The memory unit lead 11 is alternatively connected by way of a double throw switch 52 by way of a voltage divider 53 to the power source 41 or through a current limiting resistor 54 and the voltage divider 53 to the power source 41, the signal across the resistor 54 being applied to a suitable utilization device of any known type.

The operation of the network illustrated in FIGURE 4 is clear from the above description. In storing information into the memory unit 10 the switches 42 and 52 are positioned to place the amplifier 40 into the circuit and to bypass the resistor 54 whereby each binary pulse fed into the amplifier 40 results in a corresponding intersification of the election beam to a point sufficient to recess the memory unit face layer 13 at positions determined by the synchronized address code signals and sweep signal. In reading out information the switches 42 and 52 are positioned to bypass the amplifier 40 and connect the memory 10 through the resistor 54. The generator 43 periodically pulses the electron beam to an intensity insufficient to affect the face of the memory unit 10 but sufficient to produce an adequate signal across the resistor 54 when the electron beam strikes a memory unit recess 16. As in the case of reading in information, the address of the read out information is controlled by the input address-code signal and the saw tooth generator, as aforesaid.

While there have been described and illustrated preferred embodiments of the present invention it is apparent that numerous alterations, omissions and additions may be made without departing from the spirit thereof. For example, although the memory unit scanning means has been in the form of a magnetically or electrostatically deflected electron beam, the scanning may be effected by a electron beam which is swept to the desired position by means of suitably commutated horizontal and vertical grid wires in the known manner.

What is claimed is:

1. An information storage apparatus comprising a target member including a substrate of relatively low resistivity and an overlying face layer of a resistivity of $10^5$ to $10^{10}$ ohm meters and a thickness between 0.5 and .40 micron 5, means for projecting an electron beam onto said face layer, means responsive to an address signal for directing said beam to predetermined areas of said face layer, and means for modulating said electron beam in response to an input signal to intermittently increase the intensity thereof to a level sufficient to form separate discrete recesses in confined areas of said face layer in accordance with said input and said address signal.

2. The apparatus of claim 1 wherein said face layer is formed of a material having a melting point or sublimation point below 3700° C.

3. The apparatus of claim 1 wherein said substrate has a resistivity of less than 1000 ohm meters.

4. The apparatus of claim 1 including a readout device having an input connected to said target substrate.

5. An information storage apparatus comprising a target member including a relatively low resistivity substrate and an overlying face layer of a resistivity between $10^5$ and $10^{10}$ ohm meters, said face layer having separate discrete recesses of diameters less than 2.0 microns formed therein in accordance with predetermined information, means for sweeping an electron beam across predetermined areas of said face layer, and a readout device having an input connected to said substrate.

6. The apparatus of claim 5 wherein said substrate has a resistivity of less than 1000 ohm meters.

7. An information storage device comprising a substrate having a resistivity of less than 1000 ohm meters and an overlying face layer of a resistivity between $10^5$ and $10^{10}$ ohm meters and a thickness between 0.5 and 4.0 microns and having spaced recesses formed therein of a diameter less than 2.0 microns and arranged in accordance with predetermined information.

8. The information storage device of claim 7, wherein said recesses are closed at the bases thereof to leave said substrate unexposed in the areas of the respective recesses.

9. An information storage device comprising a substrate having a resistivity of less than 1000 ohm meters and an overlying face layer of a resistivity between $10^5$ and $10^{10}$ ohm meters and having spaced recesses formed therein of a diameter less than 2.0 microns and arranged in accordance with predetermined information.

References Cited

UNITED STATES PATENTS

| | | | |
|---|---|---|---|
| 3,226,696 | 12/1965 | Dove | 346—74 |
| 3,350,503 | 10/1967 | Gregg | 346—74 |
| 3,362,017 | 1/1968 | Brahm | 346—74 |

RICHARD A. FARLEY, *Primary Examiner.*

BRIAN L. RIBANDO, *Assistant Examiner.*

U.S. Cl. X.R.

340—173; 346—74